US008327282B2

(12) United States Patent
Arscott et al.

(10) Patent No.: US 8,327,282 B2
(45) Date of Patent: *Dec. 4, 2012

(54) EXTENDED KEYBOARD USER INTERFACE

(75) Inventors: Simon Arscott, San Francisco, CA (US); Amith Yamasani, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/249,718

(22) Filed: Sep. 30, 2011

(65) Prior Publication Data

US 2012/0023401 A1   Jan. 26, 2012

Related U.S. Application Data

(63) Continuation of application No. 12/761,962, filed on Apr. 16, 2010.

(51) Int. Cl.
G06F 3/048 (2006.01)

(52) U.S. Cl. .................. 715/769; 715/763; 715/864

(58) Field of Classification Search .................. 715/769, 715/763, 864, 863, 702
See application file for complete search history.

(56) References Cited

U.S. PATENT DOCUMENTS

| | | | |
|---|---|---|---|
| 6,266,048 B1 * | 7/2001 | Carau, Sr. ..................... | 345/168 |
| 6,677,933 B1 | 1/2004 | Yogaratnam | |
| 7,098,896 B2 | 8/2006 | Kushler et al. | |
| 7,602,378 B2 * | 10/2009 | Kocienda et al. ............. | 345/169 |
| 8,046,721 B2 * | 10/2011 | Chaudhri et al. ............. | 715/863 |
| 2005/0275633 A1 * | 12/2005 | Varanda ......................... | 345/173 |
| 2006/0209020 A1 | 9/2006 | Scheiblhuber | |
| 2007/0016862 A1 * | 1/2007 | Kuzmin ......................... | 715/700 |
| 2008/0259039 A1 | 10/2008 | Kocienda et al. | |
| 2009/0066656 A1 * | 3/2009 | Jung et al. ..................... | 345/171 |
| 2009/0216531 A1 * | 8/2009 | Yanagihara ................... | 704/235 |
| 2009/0322688 A1 | 12/2009 | Ording et al. | |
| 2010/0060585 A1 | 3/2010 | Chiu | |
| 2010/0169773 A1 * | 7/2010 | Yoo et al. ...................... | 715/702 |
| 2011/0047459 A1 * | 2/2011 | Van Der Westhuizen .... | 715/702 |

OTHER PUBLICATIONS

U.S. Appl. No. 12/761,962, by Scott Arscott, filed Apr. 16, 2010.
Office Action from U.S. Appl. No. 12/761,962, dated Nov. 14, 2011, 13 pp.
Response to Office Action dated Nov. 14, 2011, from U.S. Appl. No. 12/761,962, filed Feb. 14, 2012, 9 pp.
Office Action from U.S. Appl. No. 12/761,962, dated Apr. 26, 2012, 6 pgs.
Response to Office Action dated Apr. 26, 2012, from U.S. Appl. No. 12/761,962, filed Jul. 26, 2012, 7 pgs.

* cited by examiner

*Primary Examiner* — Omar Abdul-Ali
(74) *Attorney, Agent, or Firm* — Shumaker & Sieffert, P.A.

(57) ABSTRACT

The subject matter of this document can be implemented in, among other things, a method that includes displaying, on a user interface of a computing device, a base portion of a keyboard. The method further includes receiving, on the user interface, a user input that includes initiating a contact at a first region of the user interface that is associated with the base portion of the keyboard, moving the contact, while maintaining connection with the user interface, to a second region of the user interface that is outside the first region and that is associated with an extended portion of the keyboard, and releasing the contact at a location within the second region. The method further includes activating a selection in the extended portion of the keyboard based on the location within the second region at which the contact is released.

18 Claims, 7 Drawing Sheets

EXTENDED KEYBOARD USER INTERFACE

This application is a continuation of U.S. application Ser. No. 12/761,962 filed Apr. 16, 2010, which is hereby incorporated by reference.

TECHNICAL FIELD

This document relates to a user interface of a computing device.

BACKGROUND

Modern electronic devices may include one or more input devices that allow users to enter alphanumeric text and other characters and symbols into those devices. For example, a mobile device may include voice recognition software that transforms verbal commands into text, or may include handwriting recognition software that identifies certain patterns of curves and lines and resolves those patterns into a corresponding textual input. But, despite the proliferation of voice, handwriting, and other types of user input mechanisms, the keyboard still remains the standard input device for text-based user interfaces.

Over the years, certain aspects of keyboards as text-entry devices have changed surprisingly little. For example, the ubiquitous QWERTY keyboard layout, which was originally designed in the 1870s to prevent mechanical typewriters from jamming, is still in use on many English language keyboards today, even though the problems associated with jamming are long in the past. However, one thing that has changed significantly is the size of the devices in which keyboards are being used. As computing devices, and especially mobile computing devices, have become smaller and smaller, and as the area devoted to applications and other content has become larger and larger, the area devoted to keyboards has become correspondingly smaller.

The attempt to provide fully functional keyboards in smaller spaces may, to some extent, be limited by the size of the device and the area devoted to the keyboard, but the size of useable keys may also be an important consideration. If the keys are too small, the user may have difficulty selecting the desired key, or may mistakenly select two or more keys at once.

One approach to address these space considerations has been to assign multiple characters to individual keys, and to select from the multiple characters based on how the user interacts with the key. For example, a triple-tap keyboard may have the letters "j," "k," and "l" all assigned to a single key, where a "j" is entered if the user taps the key once, a "k" is entered if the user taps the key twice in rapid succession, and an "l" is entered if the user taps the key three times in rapid succession. Similarly, a "shift" or a "function" key may be used in combination with another key to choose a different input than that associated with pressing the key while not holding down the respective "shift" or "function" key. These and other approaches to keyboard design have included assigning multiple characters to a single key, with the user input being based on how the user interacts with that key.

SUMMARY

In general, this document describes techniques that allow a user to select an input key from a virtual keyboard that is not typically displayed on a standard virtual keyboard, and to make the selection using a single, continuous gesture or movement. For example, a user may touch a part of a touch screen that is displaying the standard virtual keyboard, drag his finger (or a stylus) to a part of the screen that is outside the standard virtual keyboard (e.g., either above, below, or to either side of the standard keyboard), and release the contact with the touch screen to select a number or symbol that is associated with the location of the release point. As the user's finger, for example, moves outside the area of the standard virtual keyboard, an extended virtual keyboard may be displayed to show the user the additional keys that are available for selection. However, if the user is familiar enough with the location of the additional keys and their corresponding release points, the user can select a key without waiting for the extended keyboard to be displayed.

In one embodiment, a method includes displaying, on a user interface of a computing device, a base portion of a keyboard. The method further includes receiving, on the user interface, a user input that includes initiating a contact at a first region of the user interface that is associated with the base portion of the keyboard, moving the contact, while maintaining connection with the user interface, to a second region of the user interface that is outside the first region and that is associated with an extended portion of the keyboard, and releasing the contact at a location within the second region. The method further includes activating a selection in the extended portion of the keyboard based on the location within the second region at which the contact is released.

Certain implementations may include one or more of the following features. The method can include displaying, on the user interface, the extended portion of the keyboard in response to the contact moving into the second region of the user interface, and removing the display of the extended portion of the keyboard in response to release of the contact, or in response to the contact moving out of the second region of the user interface. The second region of the user interface may overlap with a third region of the user interface that is associated with an application executing on the computing device. The method can include providing a feedback in response to the contact moving into the second region of the user interface, or in response to release of the contact. The feedback can include an audible or vibratory response from the computing device. The displayed extended portion of the keyboard can be semi-transparent with respect to other information displayed on the user interface. The layout of the keys included in the extended portion of the keyboard, and the character associated with a key of the extended keyboard can be based on the application executing the keyboard. The user interface can include a touch screen of the computing device, and the contact can include a digit of a user contacting the user interface.

In another embodiment, a computer-implemented system includes a graphical user interface configured to display a primary keyboard in a first area of the user interface. The primary keyboard includes a set of primary keys. The system further includes means for activating a selection of a secondary key from an extended keyboard using a single, continuous gesture that is initiated while the extended keyboard is not displayed on the user interface, wherein the extended keyboard is associated with a second area of the user interface that is separate from the first area.

The techniques described herein may provide one or more of the following advantages. In some implementations, the selection techniques may allow for an efficient, single-gesture input of numbers, special symbols, or other characters that are not typically associated with a standard virtual keyboard, rather than using multiple keystrokes or complex menu systems to enter the same character. In addition, the virtual keyboard display may remain uncluttered by providing the additional keys in a separate space from the standard keys, rather than displaying multiple different input options that are associated with individual keys on the user interface. Furthermore, the extended keyboard may be selectively rendered on the user interface in a manner that allows unobtrusive input of the characters associated with the extended keyboard.

The details of one or more embodiments are set forth in the accompanying drawings and the description below. Other features, objects, and advantages will be apparent from the description and drawings, and from the claims.

BRIEF DESCRIPTION OF DRAWINGS

Like reference symbols in the various drawings indicate like elements.

DETAILED DESCRIPTION

In general, this disclosure describes techniques for inputting characters into a computing device using an extended virtual or soft keyboard of the computing device. The extended keyboard includes keys associated with characters that are not available on a standard virtual keyboard that is used for entering text into the computing device. Using a single, continuous gesture or movement, a user may access the extended virtual keyboard, and select a non-standard character from the extended virtual keyboard for entry into the computing device. The gesture or movement may include contacting the computing device in a region that is associated with the standard virtual keyboard, and sliding the contact outside the region associated with the standard virtual keyboard and into a region associated with the extended virtual keyboard. Upon release of the contact in the region associated with the extended virtual keyboard, a character from the extended keyboard is input based on the location where the release occurred. For example, if the user releases the contact in an area of the extended keyboard associated with an "&" key, then an "&" character is input to the computing device. In this example, the "&" key is not available to be directly selected from the standard keyboard. In some situations, the user may become familiar enough with the layout of the extended keyboard that he can make a selection of a key before the extended keyboard is displayed on the screen.

Figure 1:
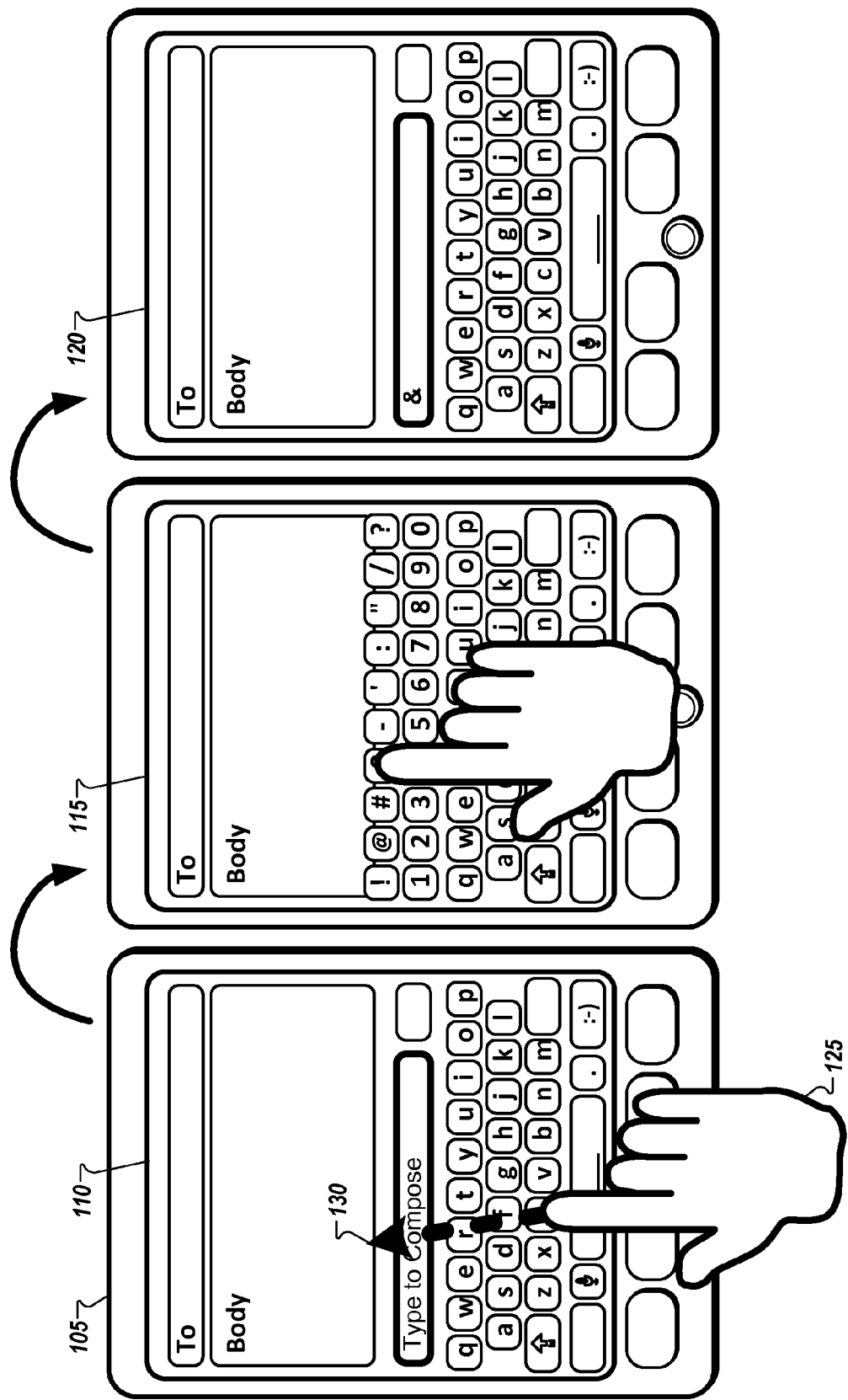
FIG. 1 is a diagram illustrating example screens of a computing device as a user interacts with the device.

FIG. 1 is a diagram illustrating example screens of a computing device as a user interacts with the device. As shown in the example, a series of screens 110, 115, and 120 may be shown on a computing device 105, such as a mobile device (e.g., a smart phone). Screens 110-120 illustrate an example progression, according to the techniques described herein, as the user provides input to the computing device. Screens 110-120 may be displayed on a monitor or any other appropriate display device for presentation of visual information to a user of the computing device. In the example of FIG. 1, screens 110-120 are shown on a display of a smart phone 105. In other implementations, screens 110-120 may be shown on other types of displays, such as on a monitor connected to a desktop computer, or the like.

The computing device may include one or more input devices that allow a user to interact with the device. Example input devices may include, for example, a mouse, a touchpad, or a trackpad. In some implementations, these input devices may allow a user to control a cursor or other type of pointer to facilitate entry of characters into the computing device. In other implementations, the display and the input mechanism of the computing device may be combined, such as in a touch screen user interface that both displays the screens to the user, and also accepts user inputs via touch from the user, a stylus, or the like.

Screen 110 shows an example e-mail application that is running on computing device 105. The e-mail application allows the user to enter text into various fields, such as a "To" field and a "Body" field. The e-mail application shown is for illustrative purposes only, and it should be understood that the techniques described in this disclosure are applicable to any application or interface that allows input via a virtual keyboard.

Screen 110 also shows an example of a standard keyboard that is used in conjunction with the e-mail application to allow the user to enter text into the appropriate fields. The content and layout of the standard keyboard may be different in various contexts, depending on the configuration of the user interface and the application that is using the keyboard. For example, in a traditional text-entry context, the standard keyboard may include letters and other commonly used keys or characters to allow the user to efficiently enter text into the computing device. As another example, such as in a gaming context, the standard keyboard may include various other keys and inputs that are specifically optimized for use with the game.

In the example shown in FIG. 1, the standard keyboard includes the lower-case letters of the English alphabet. The standard keyboard also includes other text entry keys, such as an "upper-case" key, a "space bar" key, and a "." key, among others. If the user wishes to enter a character from among the standard keys, he may select the key using known techniques, such as by selecting and releasing the appropriate key. For example, to enter an "h" into the e-mail application, the user may contact (e.g., by touching) the area associated with the "h" key, and release the contact. According to various implementations, if a user touches the screen in one location of the standard keyboard and releases the touch in another location of the standard keyboard, a number of different things may happen. In one implementation, the key that was pressed first may be input. For instance, if the user first touches the "j" key, and then slides to the "o" key, then "j" would be entered in the text box.

In another implementation, both the key that was pressed first, and the key that the user moved to may be input to the computing device. In the previous example, "jo" would be entered in the text box. In another implementation, only the key where the user released may be input. In the example above, "o" would be entered in the text box. In another implementation, if the user does not release from the same location as the original touch, then nothing may be entered, as the device may interpret the selection as invalid or as a mistake by the user. In yet another implementation, the computing device may ask the user which key entry was intended, such as via an onscreen dialog box.

To input a character that is not accessible via the standard keyboard, the user may access an extended keyboard, such as the one displayed in screen 115. As shown in example screen 115, the extended keyboard is located above the standard keyboard and includes a top row of characters (including "!, @, #, &, -, ', :, ", /, and ?" in the example shown), and a bottom row of numbers (including "1, 2, 3, 4, 5, 6, 7, 8, 9, and 0" in the example shown). The content and the layout of the keys on the extended keyboard in screen 115 are shown for illustrative purposes only, and other configurations are possible. For example, the extended keyboard may include a single row of keys, or more than two rows of keys. As another example, the rows of the extended keyboard may be switched, such that the row of numbers is the top row of the keyboard. In yet another example, the keys may instead correspond to uppercase letters of the alphabet. As described in further detail below, the content and configuration of the extended keyboard may also be based on a number of different factors, including the type of computing device, the application that is executing on the computing device, and the user's previous activity or preferences, for example.

As can be seen in example screen 110, the extended keyboard is not shown on the computing device 105 until the user activates the extended keyboard using the gesture shown in screen 110. To activate the extended keyboard, the user first makes contact with the standard keyboard portion of the user interface, and then, while still holding the contact with the screen, sliding the contact upwards to the portion of the user interface that is associated with the extended keyboard, such as location 130. The sliding motion is represented by the dotted arrow shown on screen 110. After the contact has moved outside the portion of the user interface associated with the standard keyboard, and entered into the portion of the user interface associated with the extended keyboard, the extended keyboard may be displayed, as shown in screen 115.

To select one of the keys from the extended keyboard, the user may release the contact with the user interface at the location associated with the desired key. In the example, the extended key where the user releases the contact, as shown in screen 115, is an "&" key. After the user releases the contact, the selected character is entered into the e-mail application, as shown in screen 120.

Following actuation of a key from the extended keyboard, the extended keyboard may be deactivated and removed from the display immediately after the contact is released by the user. Alternatively, the display of the extended keyboard may gradually fade out over a period of time, or may be removed from the display a relatively short time (e.g., 200 milliseconds) after the user releases the contact. In other implementations, the extended keyboard may remain activated and displayed following a selection of an extended key, and may remain activated and displayed until the user either touches a key in the base keyboard or touches another region of the screen, for example. In some implementations, a combination of these techniques may be used—e.g., the extended keyboard may remain activated and displayed for a period of time (e.g., 2 seconds) during which time the user may select additional keys from the extended keyboard.

Various visual, audible, or tactile feedback mechanisms may be used to indicate to the user that the extended keyboard has been activated. These feedback mechanisms may help the user know whether or not the keyboard activation gesture has been recognized by the computing device, especially in situations where the extended keyboard has not yet been visually displayed. In some implementations, the visual display of the extended keyboard may show the user that the extended keyboard has been activated. In other implementations, the computing device may produce an audible tone to indicate that the extended keyboard is active. In other implementations, haptic feedback or other types of tactile feedback may be provided to the user to signal that the user may enter a key from the extended keyboard by releasing the contact in the appropriate area. In some implementations, various combinations of these and/or other appropriate types of feedback may be utilized.

Similar types of feedback may also be provided to indicate to the user that a key from the extended keyboard has been selected. For example, upon selecting a key from the extended keyboard, a visual, audible, or tactile feedback may indicate the selection event to the user. In some implementations, various combinations of feedback may be provided to the user to indicate character selection. For example, a visual cue such as the selected character appearing on the screen, or the selected key changing appearance, may be combined with haptic feedback to indicate that the character has been entered.

Figure 2:
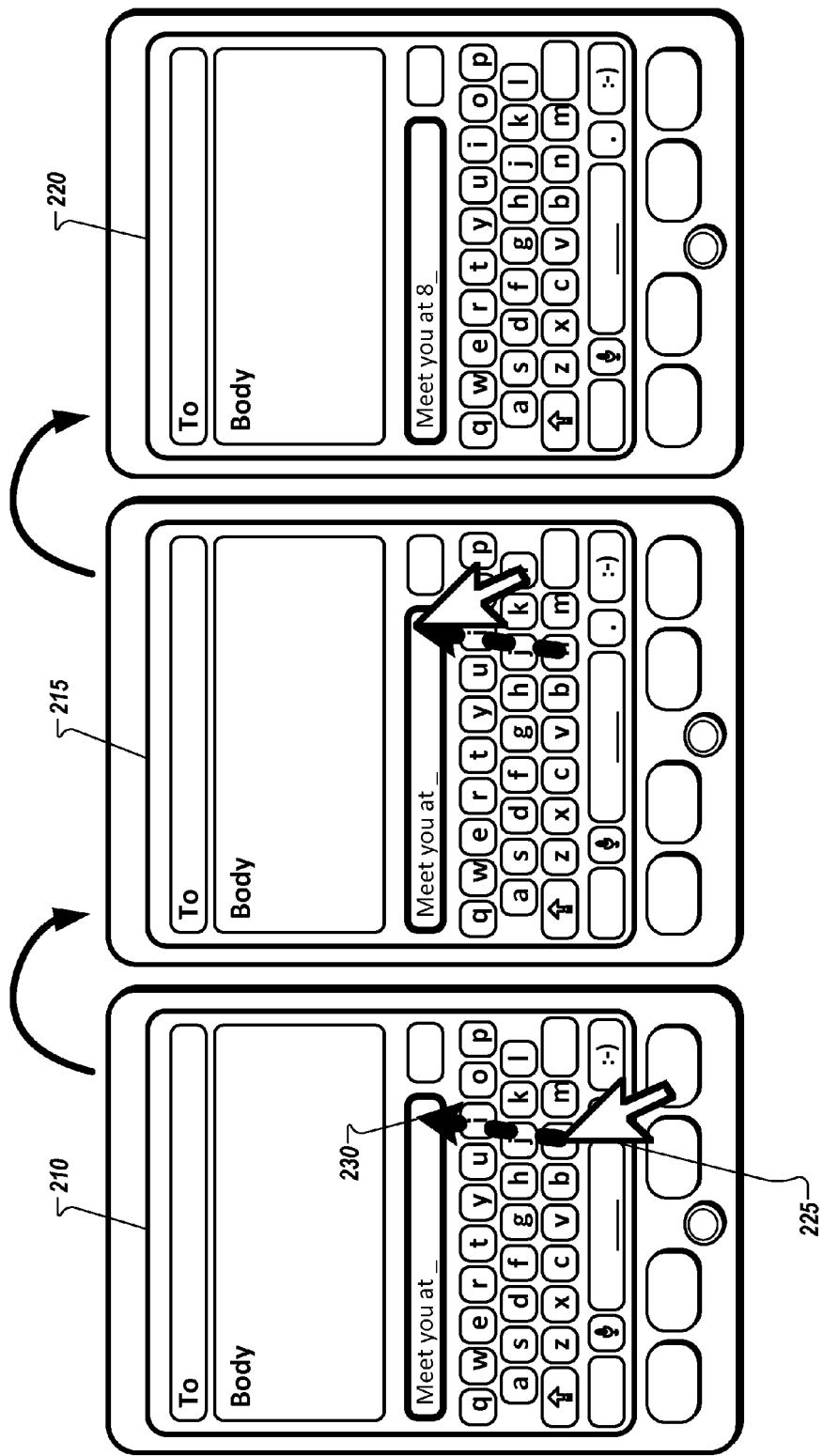
FIG. 2 is a diagram illustrating additional example screens of a computing device as a user interacts with the device.

FIG. 2 is another diagram illustrating example screens of a computing device as a user interacts with the device. In this example, rather than a user's hand being used to enter characters, a pointer 225 is used. Pointer 225 is an on-screen cursor that may be used to interact with the standard keyboard, the extended keyboard, and the application executing on the computing device. Pointer 225 may be controlled using any appropriate input device, such as a mouse, a trackball, or the like, to move pointer 225 to the various regions of screens 210, 215, and 220.

Pointer 225 may be used in a similar fashion as a touch screen input described above in conjunction with FIG. 1. For example, to choose a letter from the standard keyboard, the user may move pointer 225 to a desired key, and may actuate a selection mechanism on the input device, such as a mouse click. The mouse click may enter the character corresponding to the desired key into the computing device. As shown in example screens 210-220, the user has already begun typing the text "Meet you at" in an e-mail application of the computing device. An underscore in the text-entry box shows the location of the next character that is to be entered.

The activation of the extended keyboard and selection of one of the keys from the extended keyboard may also operate in a similar fashion to the gesture described in conjunction with FIG. 1. For example, to input a character that is not accessible via the standard keyboard, the user may activate an extended keyboard. To activate the extended keyboard, the user first makes a selection in the standard keyboard portion of the user interface, such as by clicking while pointer 225 is within the region associated with the standard keyboard. While holding the click, pointer 225 is then moved to a region of the user interface associated with the extended keyboard, such as location 230. This click-and-drag motion is represented by the dotted arrow shown on screens 210 and 215. In the example shown, the user clicks on the letter "n" in the standard keyboard region, and drags upwards and to the right to location 230. It should be understood that the user may click anywhere in the region associated with the standard keyboard to initiate the click-and-drag motion to activate the extended keyboard.

As pointer 225 exits the region associated with the standard keyboard and enters the region associated with the extended keyboard, the extended keyboard is activated, even if the extended keyboard is not displayed on the screen. As such, although the extended keyboard is not displayed on screen 215, a two-row extended keyboard such as the one shown on screen 115 of FIG. 1 may be active and ready for selection of a key once pointer 225 enters the region associated with the extended keyboard. As such, when the user releases the click at location 230 of the extended keyboard, which corresponds to the "8" key, the "8" character is entered into the computing device as shown in screen 220. Once again, the specific configuration of the extended keyboard described here is for illustration purposes only. The content and configuration of the extended keyboard may be based on a number of different factors, including the type of computing device, the application that is executing on the computing device, and the user's previous activity or preferences, for example.

As described above, visual, audible, or tactile feedback mechanisms may be used to indicate to the user that the extended keyboard has been activated. These feedback mechanisms may help the user know whether or not the keyboard activation gesture has been recognized by the computing device, especially in situations where the extended keyboard has not yet been visually displayed, such as in screen 215. Similar types of feedback mechanisms may also be used to indicate to the user that a key from the extended keyboard has been selected.

Figure 3:
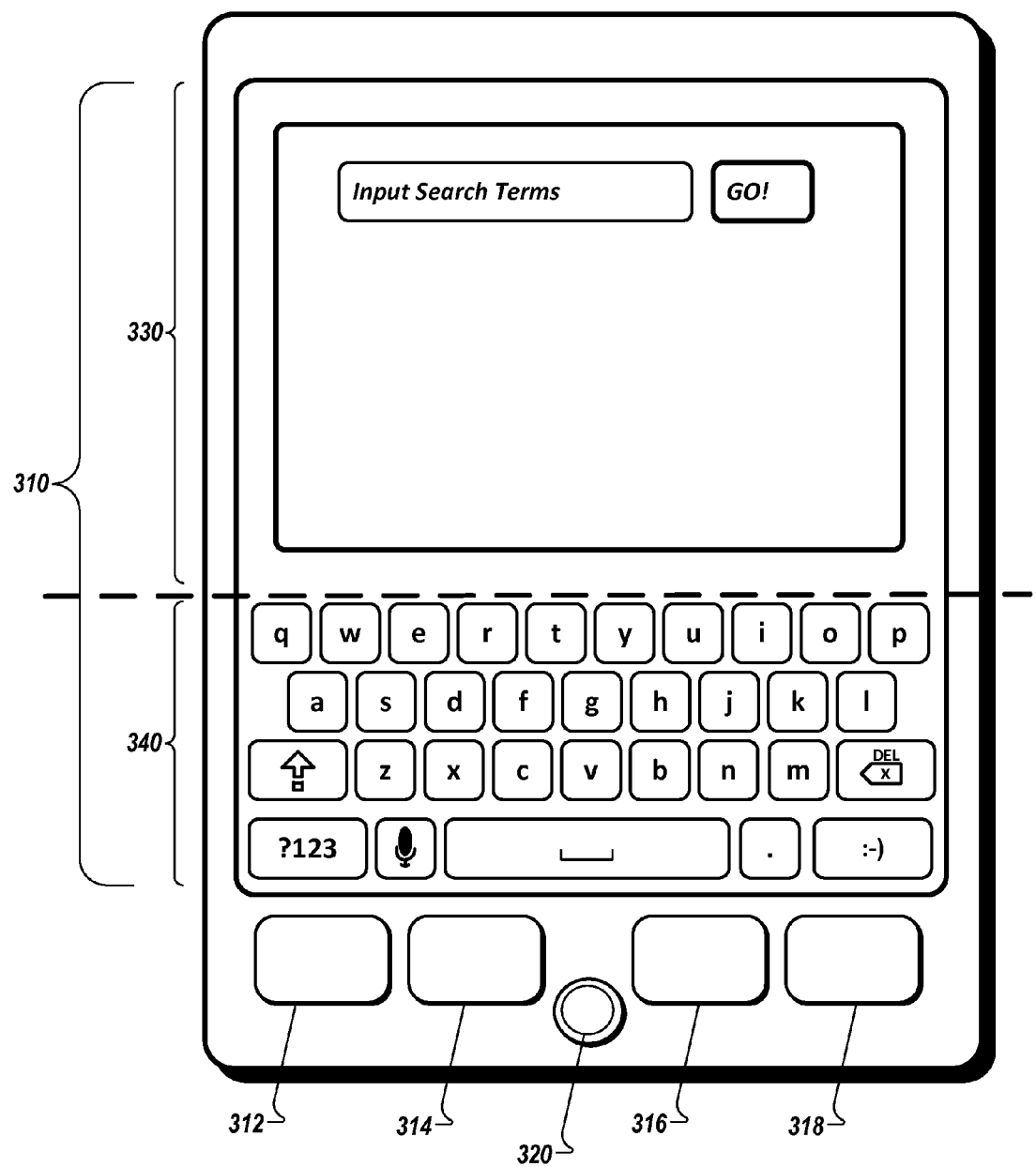
FIG. 3 is a diagram illustrating an example user interface of a computing device.

FIG. 3 is a diagram illustrating an example user interface of a computing device. The user interface may include a display screen 310, and off-display input devices, such as hard keys 312-318, and a trackball 320. Hard keys 312-318 may be dedicated keys that are associated with a particular functionality (or multiple functionalities) of the computing device. For example, in a smart phone, one or more of hard keys 312-318 may correspond to a "pick up" function of the phone, or a "hang up" function of the phone, etc. Trackball 320 may be used to control a pointer, such as pointer 225, which can be used to select or actuate various functions of the smart phone.

Display screen 310 may be physically and/or logically divided into multiple regions. In the example shown, display screen 310 is logically divided into an application region 330 and a standard keyboard region 340, as indicated by the dotted line. The division shown is for illustration purposes, and it should be understood that the contents, size, shape, and/or other configuration of these regions may be altered in different implementations. The user may interact with the different regions according to common techniques in the art. For example, the user may select the "Go!" button in application region 330 to proceed with a search using a search application executing on the computing device. Similarly, the user may select any of the keys in standard keyboard region 340 to enter text-based input into the computing device.

An extended keyboard region (not shown) may also be activated on the user interface if the user has activated the extended keyboard as described above. For example, if the user makes contact in standard keyboard region 340, and while holding the contact with the screen, moves the contact to a location above the dotted line into a region that is associated with the extended keyboard, the extended keyboard may be activated, but not yet shown to the user.

Figure 4:
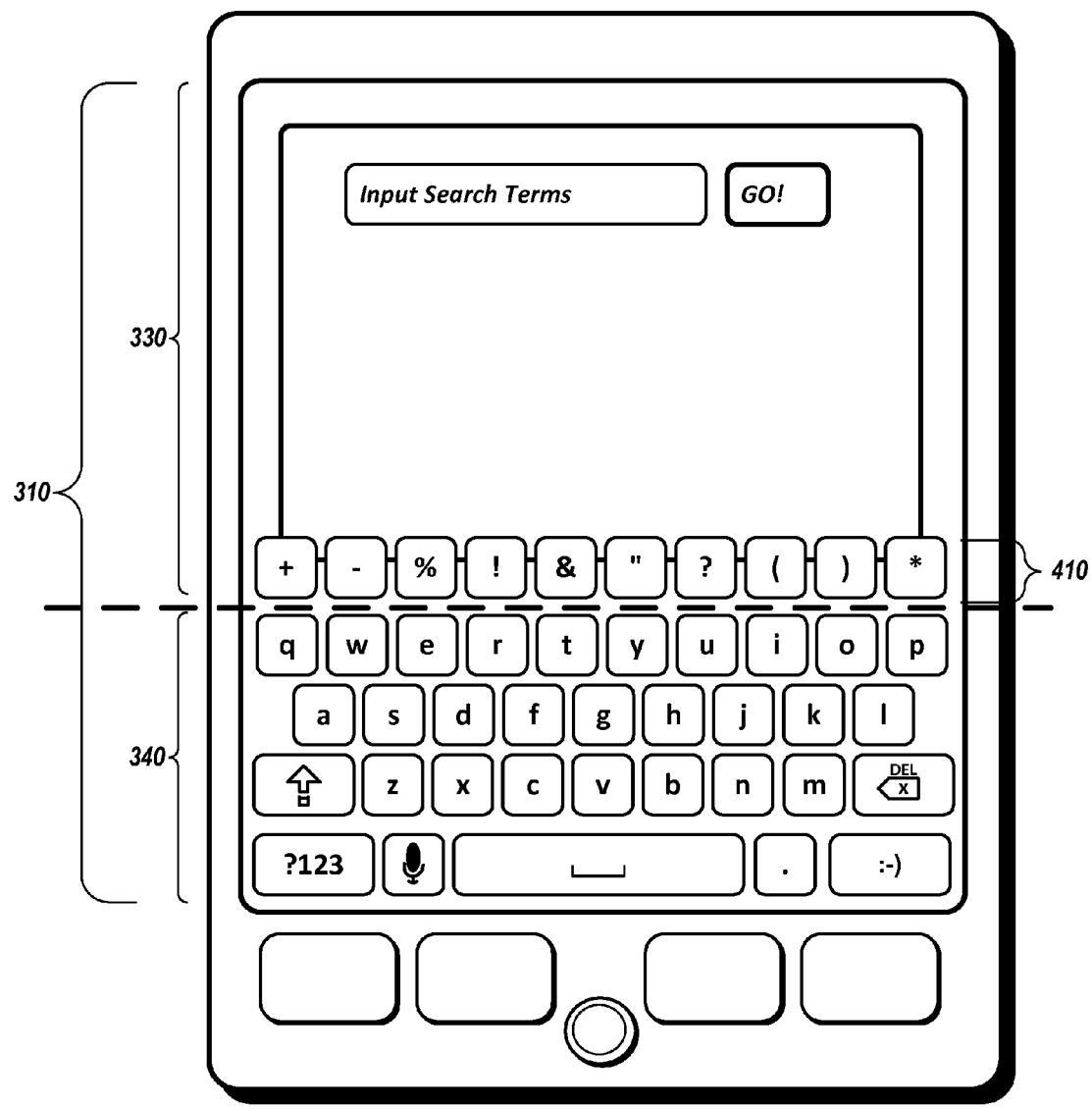
FIG. 4 is a diagram illustrating an example user interface of a computing device.

FIG. 4 is another diagram illustrating an example user interface of a computing device. As shown in the example, the computing device includes the same regions as those shown in FIG. 3, and it also includes an extended keyboard region 410 that is associated with the extended keyboard. As described above, the extended keyboard may be activated and displayed in extended keyboard region 410 when a user performs a gesture consistent with the techniques described herein.

As shown in the example, extended keyboard region 410 overlaps with application region 330, but both are logically separated from standard keyboard region 340, as indicated by the dotted line. When extended keyboard region 410 overlaps with application region 330, the keys of the extended keyboard may be semi-transparent to allow the user to see the entire application region 330 while the extended keyboard is displayed. In other implementations, application region 330 may be resized when the extended keyboard is activated, such that three logical divisions appear on the display. For example, application region 330 may be shrunk by a corresponding amount of space that extended keyboard region 410 occupies. In such implementations, the resizing of application region 330 may occur upon activation of the extended keyboard, and the size of application region 330 may be restored when the extended keyboard is deactivated.

In the example shown in FIG. 4, the application executing on the computing device is a search application. The search application has a different extended keyboard associated with it than the extended keyboard associated with the e-mail application shown in FIGS. 1-2. As such, while the standard keyboard that includes lower-case English letters may remain the same for both applications, the extended keyboard may be customized for a search application to include commonly used Boolean operators and/or other characters that are useful in a search application, but that are not as commonly used in an e-mail application. This and other configuration options for the extended keyboard are described below.

Figure 5:
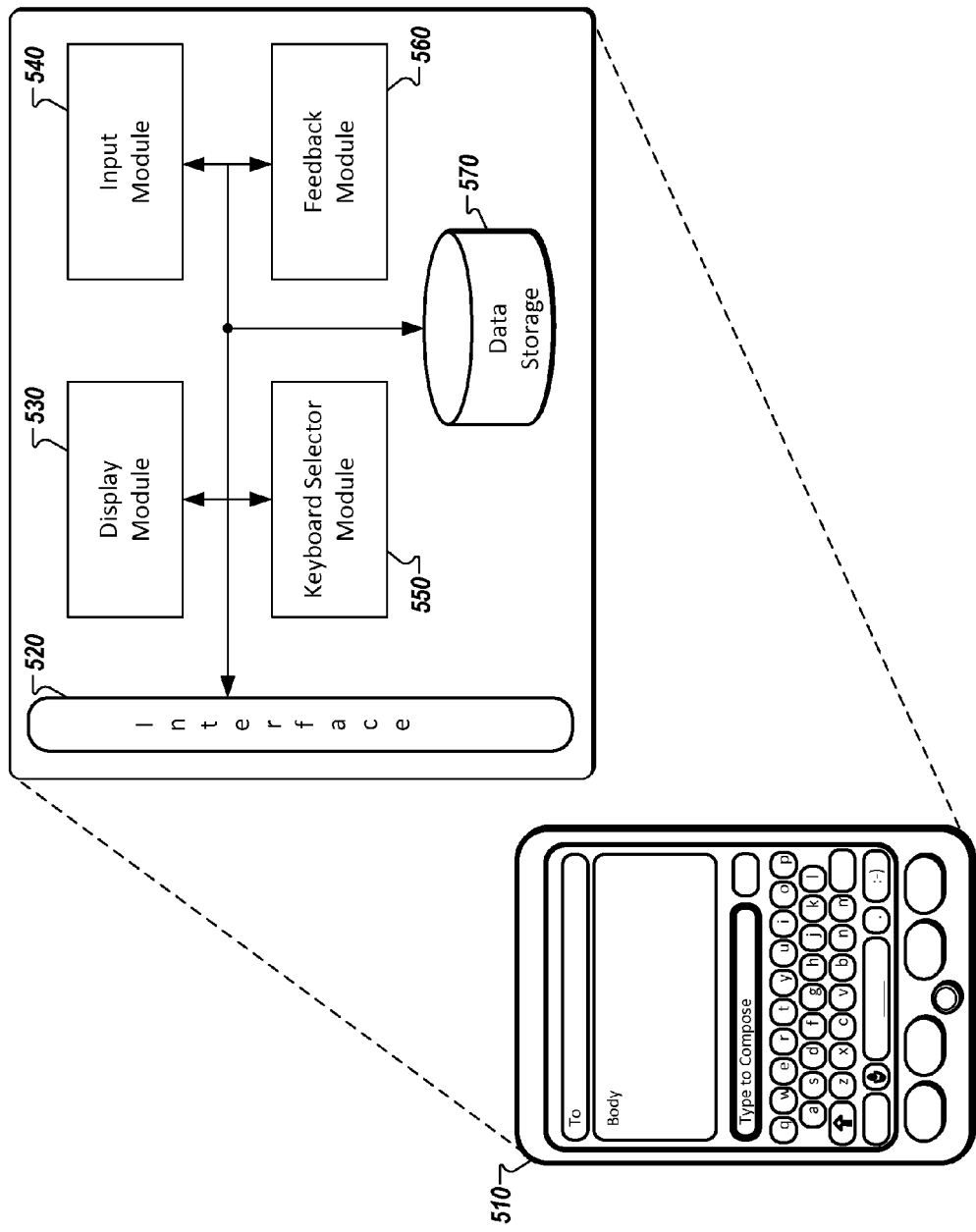
FIG. 5 is a conceptual diagram illustrating example components of a computing device.

FIG. 5 is a conceptual diagram illustrating example components of a computing device 510. Computing device 510 may include, for example, an interface 520, a display module 530, an input module 540, a keyboard selector module 550, a feedback module 560, and data storage 570. In other implementations, computing device 510 may include different, fewer, or additional modules for performing the techniques described herein.

Interface 520 of computing device 510 may include various input and output devices that allow the user to interact with the device. Output devices may include, for example, the display screen and feedback response mechanisms described above. Input devices may include a mouse, a trackball, or the like, to control a pointer or other type of cursor for interacting with computing device 510. Other input devices may include hard keys and/or a touch screen interface that converts touches on the screen to inputs to computing device 510.

Computing device 510 also includes a display module 530 that determines what should be displayed on the screen, and where those items should be displayed on the screen. For example, display module may control where and how different logical regions, such as application region 330, standard keyboard region 340, and extended keyboard region 410 are displayed.

Input module 540 monitors inputs to the user interface, and interprets what those inputs mean in a particular context. For example, input module 540 may interpret different types of touches in standard keyboard region 340 differently. A first type of contact, such as a touch and release within standard keyboard region 340 may indicate a user's desire to input a character from the standard keyboard into computing device 510, while a second type of contact, such as a touch, hold, and move gesture as described above may indicate a user's desire to activate the extended keyboard.

Keyboard selector module 550 of computing device 510 determines which keyboards to use in a particular context. Computing device 510 may include a number of different standard and/or extended keyboards, each of which may be stored in data storage 570. Various keyboards may include different characters (e.g., English letters, Chinese characters, numbers, symbols, etc.) and/or different configurations (e.g., a standard QWERTY layout, an alphabetical layout, a gaming layout, etc.). In normal situations, keyboard selector module 550 may provide a default standard keyboard and/or a default extended keyboard for entry of characters into computing device 510. In other situations, such as where an application specifies a particular keyboard, keyboard selector module 550 may provide the standard keyboard and/or extended keyboard as specified by the application that calls for use of the respective keyboards.

Keyboard selector module 550 may also be configured to select an appropriate standard and/or extended keyboard for use based on a particular context, which may take into account a number of different factors. For example, the standard and/or extended keyboards may be configurable to include different characters or keys, depending on the application calling for use of the keyboard (e.g., a character set optimized for the type of characters most often used in a particular application). Similarly, the keyboards may be configurable to include a different layout of the characters or keys included on the keyboard (e.g., a layout that places the most often used keys in a prominent position within the keyboard). The content or layout of the keyboard may also be based on the type of device that is being used (e.g., if the device already has hard keys assigned to a particular character, that character may not be included on the standard and/or extended keyboard). In addition, the content or layout of the keyboard may be based on the user's actions or preferences (e.g., the extended keyboard may include the last twenty non-standard characters that the user entered to provide easy access to the non-standard characters used most often by the user).

Feedback module 560 provides feedback to the user based on user interaction with computing device 510. Feedback module 560 may provide visual, audible, tactile, and/or other appropriate feedback indicators, either alone or in combination. For example, when a user has activated the extended keyboard or selected a key from the extended keyboard, feedback module 560 may provide a visual indicator related to the activation or selection, may provide an audible tone related to the activation or selection, and/or provide tactile feedback related to the activation or selection.

Data storage 570 is configured to store information within computing device 510 during operation. Data storage 570 is a computer-readable storage medium that comprises memory, and may be used to store different configuration information, which may be retrieved by respective modules 530-560 as needed. For example, different extended keyboard configurations may be stored in data storage 570, such as in separate files that correspond to the available extended keyboards. Each extended keyboard may be represented, for example, in an Extensible Markup Language ("XML") configuration file that defines the appearance, content, and location of the keys that are included on the extended keyboard. In some implementations, the XML configuration file may be stored in data storage 570, and may be retrieved using keyboard selector module 550 if the module determines that the particular configuration is to be used.

Figure 6:
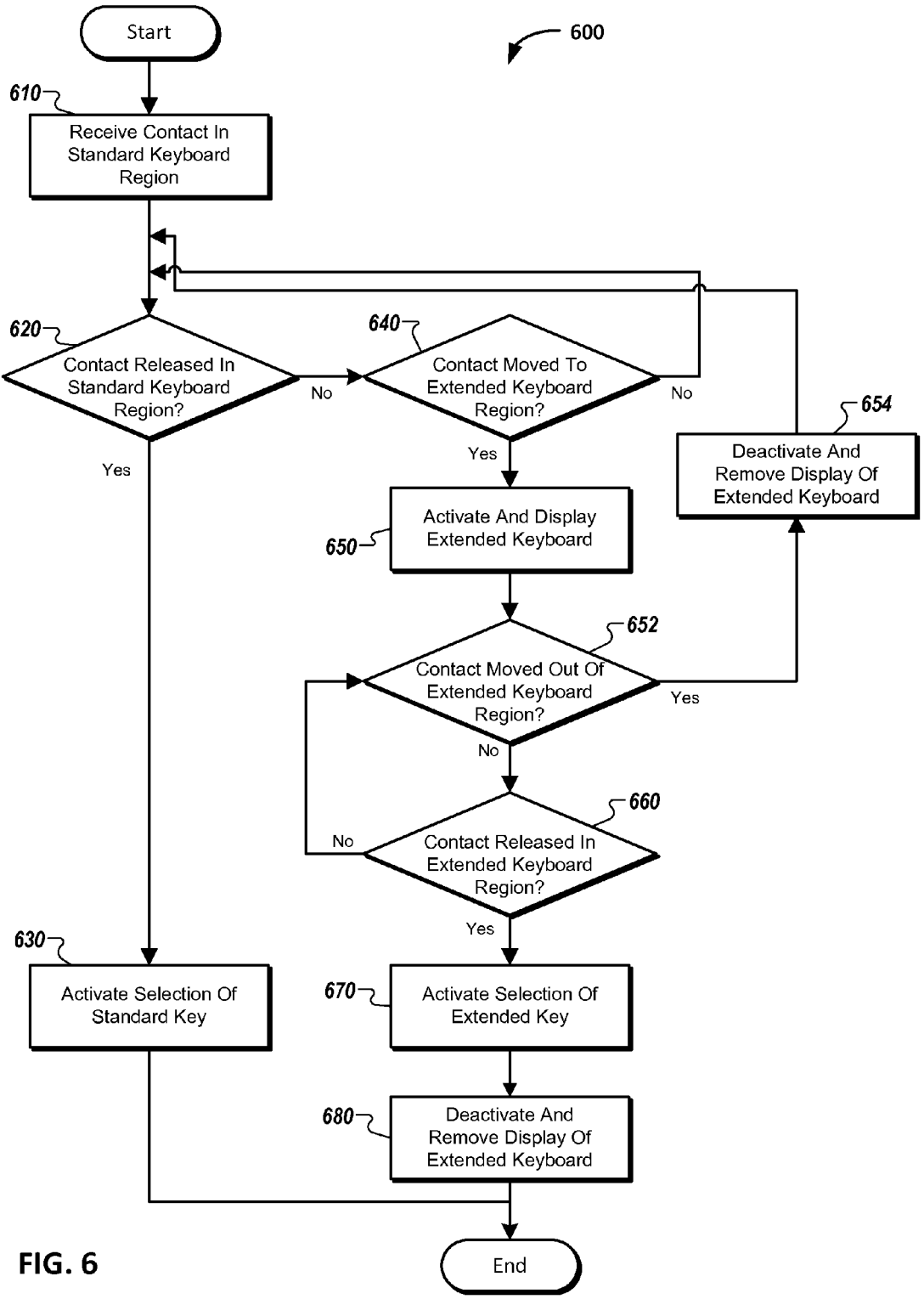
FIG. 6 is a flow diagram illustrating an example process for activating an input selection.

FIG. 6 is a flow diagram illustrating an example process 600 for activating an input selection. Example process 600 may be used by a computing device, e.g. computing device 105, or various modules 530-560 of computing device 510, to activate an input selection of a key from either the standard or extended keyboard.

Example process 600 begins when a user initiates a contact in the standard keyboard region, e.g., region 340, of a computing device (610). The computing device then monitors the contact to determine whether the contact is released in the standard keyboard region (620). If the contact is released in the standard keyboard region, then the computing device activates a selection of a standard key (630). For example, to enter a "g" character into an application executing on the computing device, the user may touch the area associated with the "g" key in the standard keyboard region, and release the touch.

If the contact is not released in the standard keyboard region, then it is determined whether the contact has moved to the extended keyboard region, e.g., region 410, of the computing device (640). If not, then the computing device continues to monitor whether the contact is released in the standard keyboard region (620).

If the contact is moved to the extended keyboard region of the computing device, then the extended keyboard is activated and displayed to the user (650). As described above, the extended keyboard may become activated before the keyboard is displayed to the user, and the user can make a selection from the extended keyboard without the keyboard first being displayed. Depending on the context of how the extended keyboard is being used, different extended keyboards and/or configurations may be displayed to the user upon activation, as described in greater detail above. In some situations, the extended keyboard may not be displayed to the user, such as if the user quickly moves the contact outside of the extended keyboard region, or if the user quickly releases the contact in the extended keyboard region. In both situations, the screen may not update quickly enough for the extended keyboard to be displayed.

The computing device also monitors whether the contact has been moved out of the extended keyboard region (652). If the user does move the contact out of the extended keyboard region, such as by moving the contact back into the standard keyboard region, the extended keyboard is deactivated and the display of the extended keyboard is removed (654).

If the contact has not moved out of the extended keyboard region, the computing device monitors whether the contact is released in the extended keyboard region (660). If not, the computing device continues to monitor whether the contact has been moved out of the extended keyboard region (652). But if the contact is released in the extended keyboard region, the computing device activates the selection of the appropriate extended key (670). For example, each of the keys in the extended keyboard may be assigned a particular area, such that if the user releases the contact in a location that is within the assigned area, the character associated with that key is entered into the computing device. So, if the user releases the contact at a location within the area assigned to the "*" key on the extended keyboard, then the "*" character is input into the computing device. Following the selection of a key from the extended keyboard, the extended keyboard may be deactivated, and the display of the extended keyboard may be removed (680).

Figure 7:
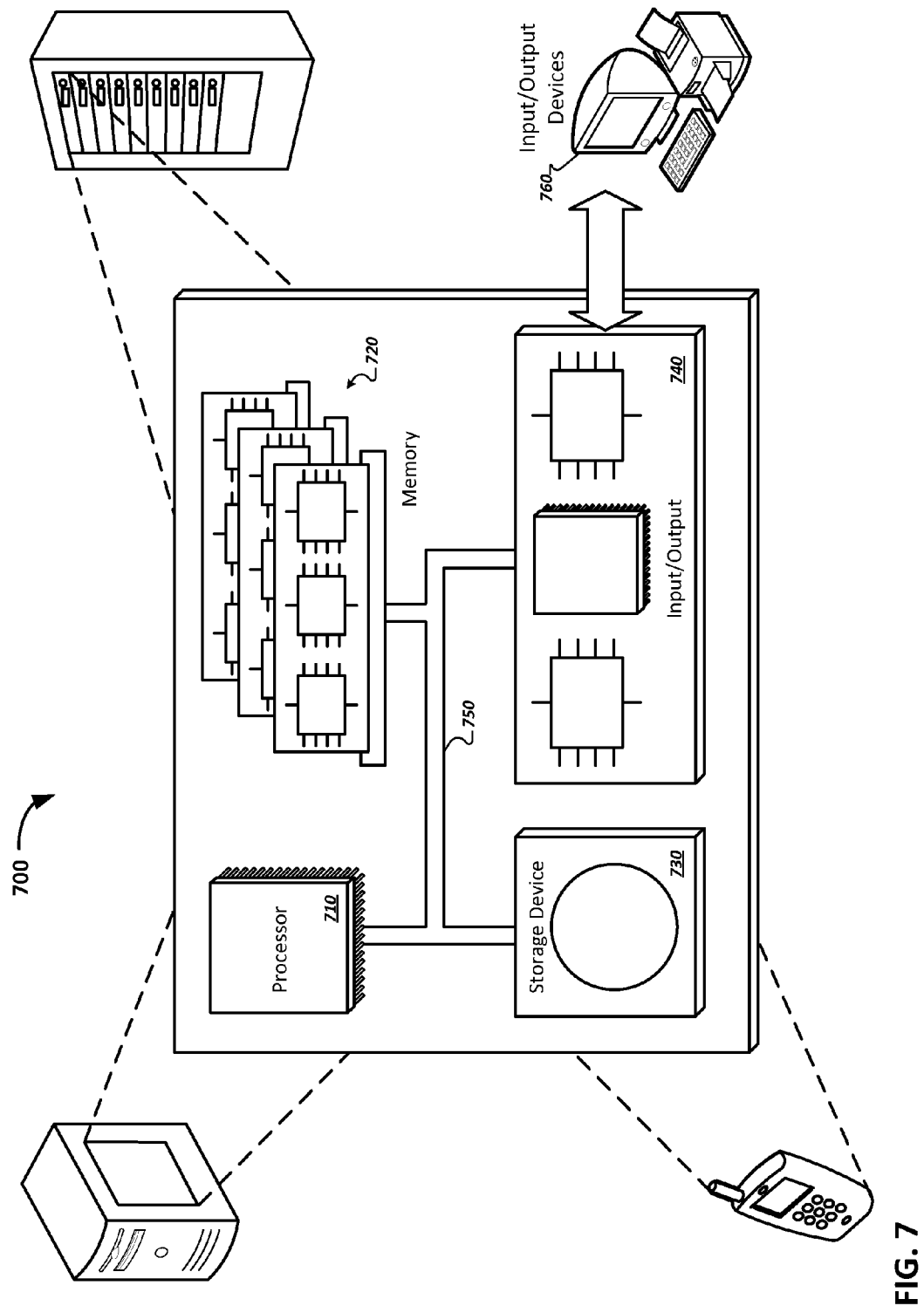
FIG. 7 is a conceptual diagram illustrating example components of a computing system that may be used to implement one or more of the techniques described in this document.

FIG. 7 is a conceptual diagram illustrating example components of a computing system that may be used to implement the techniques described in this document. As depicted in FIG. 7, computing system 700 may include various types of computing devices, such as a desktop computer, a smart phone, a network server, or a mainframe computer. Although not depicted in FIG. 7, devices incorporated in computing system 700 may also or alternatively include any number of other devices configured to compute and/or communicate via a network, including laptop computers and mobile devices such as mobile phones, personal digital assistants, or other mobile devices. Any of these computing devices may be representative of computing device 510 depicted in FIG. 5.

System 700 includes a processor 710, a memory 720, a storage device 730, and an input/output component 740. Each of components 710, 720, 730, and 740 may be interconnected via a system bus 750 for inter-component communications. Processor 710 may be configured to process instructions for execution within system 700. Processor 710 may be a single threaded processor, or may be a multi-threaded processor configured to process various instructions in parallel simultaneously. Processor 710 may be capable of processing instructions stored in memory 720 or instructions stored on storage device 730. In one example, processor 710 may be configured to process instructions to cause a computing device to activate an input selection, as shown in one embodiment in FIG. 6.

System 700 further includes peripheral devices 760. Peripheral devices 760 may include, for example, a monitor or other display device for presentation of visual information to a user of system 700. Peripheral devices 760 may further include one or more input devices to enable a user to input data to system 700, e.g., a keyboard, mouse, touchpad, trackpad, etc. Peripheral devices 760 may further include printers or other devices to output information. In one example, processor 710 may be configured to process instructions to cause a screen, e.g., screen 110 of FIG. 1, to be displayed to a user via a display of peripheral devices 760.

Memory 720 may be configured to store information within system 700 during operation. Memory 720 may be described as a computer-readable storage medium. In some examples, memory 720 is a temporary memory, meaning that a primary purpose of memory 720 is not long-term storage. Memory 720 may also be described as a volatile memory, meaning that memory 720 does not maintain stored contents when the computer is turned off. Examples of volatile memories include random access memories (RAM), dynamic random access memories (DRAM), static random access memories (SRAM), and other forms of volatile memories known in the art.

In some examples, memory 720 may be used to store program instructions for execution by processor 710. In other examples, memory 720 may be used by software or applications running on system 700 to temporarily store information during program execution.

Storage device 730 may also be described as a computer-readable storage medium. In contrast to memory 720, storage device 730 may be configured to store larger amounts of information than memory 720. Storage device 730 may further be configured for long-term storage of information. In some examples, storage device 730 is a non-volatile memory component. In contrast with a volatile memory component, a non-volatile memory may store data whether or not power is supplied to storage device 730. Examples of non-volatile storage devices include magnetic hard discs, optical discs, floppy discs, Flash memories, and other forms of electrically programmable memories (EPROM) or electrically erasable and programmable (EEPROM) memories.

The techniques described here may be implemented according to a computing system 700 as described with respect to FIG. 7 in any combination of digital electronic circuitry, computer hardware, firmware, software, or any combination of digital electronic circuitry, computer hardware, firmware, software. For example, any of the techniques described herein may be implemented via executable program instructions stored in a computer-readable storage medium (e.g., memory 720 and/or storage device 730) that are readable by processor 710 to cause processor 710 to perform the techniques of this disclosure. In other examples, some or all of the techniques of this disclosure may instead or in addition be implemented via dedicated hardware configured for a specific purpose, e.g., a field programmable gate array (FPGA), application specific integrated circuit (ASIC), digital signal processor (DSP), or another like device. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The described features can be implemented advantageously in one or more computer programs that are executable on a programmable system including at least one programmable processor coupled to receive data and instructions from, and to transmit data and instructions to a computer-readable storage medium. A computer program can be written in any form of programming language, including compiled or interpreted languages, and it can be deployed in any form, including as a stand-alone program or as a module, component, subroutine, or other unit suitable for use in a computing environment.

The described features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as described above. The relationship of client and server arises by virtue of computer programs running on the respective computers and having a client-server relationship to each other.

A number of embodiments have been described. Nevertheless, it will be understood that various modifications may be made without departing from the spirit and scope of the disclosure. For example, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other embodiments are within the scope of the following claims.

What is claimed is:

1. A method comprising:
   outputting, at a touch-sensitive display coupled to a computing device, a base portion of a virtual keyboard;
   receiving, at the touch-sensitive display, (1) an initial contact at a first region of the touch-sensitive display, the first region being associated with the base portion of the virtual keyboard, and (2) a dragging contact that originates at the first region of the touch-sensitive display and moves into a second region of the touch-sensitive display, the second region being outside the first region and associated with an extended portion of the virtual keyboard;

activating, at the second region of the touch-sensitive display and in response to (2), the extended portion of the virtual keyboard, wherein the activating includes determining, by the computing device, which characters are included in the extended portion of the virtual keyboard;

if the dragging contact is released from the touch-sensitive display at a location within the second region of the touch-sensitive display, activating a selection of a character in the extended portion of the virtual keyboard based at least in part on the location within the second region of the touch-sensitive display; and if the dragging contact moves from the second region of the touch-sensitive display to a location outside of the second region, removing the extended portion of the virtual keyboard from the second region of the touch-sensitive display.

2. The method of claim 1, wherein activating the extended portion of the virtual keyboard comprises outputting, at the second region of the touch-sensitive display, the extended portion of the virtual keyboard.

3. The method of claim 2, further comprising:
if the dragging contact is released from the touch-sensitive display at the location within the second region of the touch-sensitive display, removing the extended portion of the virtual keyboard from the second region of touch-sensitive display after activating the selection of the character.

4. The method of claim 1, wherein the extended portion of the virtual keyboard is semi-transparent with respect to other information displayed on the touch-sensitive display.

5. The method of claim 1, wherein determining which characters are included in the extended portion of the virtual keyboard is based at least in part on a determination of an application with which the virtual keyboard is output.

6. The method of claim 5, wherein a layout of the characters included in the extended portion of the virtual keyboard is based at least in part on the determination of the application with which the virtual keyboard is output.

7. The method of claim 1, wherein the second region of the touch-sensitive display overlaps with a third region of the touch-sensitive display, and wherein the third region is associated with an application executing at the computing device.

8. The method of claim 1, further comprising outputting, by the computing device, feedback in response to (2).

9. The method of claim 8, wherein the feedback comprises an audible response.

10. The method of claim 8, wherein the feedback comprises a tactile response.

11. The method of claim 1, further comprising:
receiving, at the touch-sensitive display, a termination of the dragging contact; and
outputting, by the computing device, feedback in response to the termination of the dragging contact.

12. The method of claim 11, wherein the feedback comprises an audible response.

13. The method of claim 11, wherein the feedback comprises a tactile response.

14. The method of claim 1, wherein the dragging contact is performed by a digit of a user that touches the touch-sensitive display.

15. A computer-readable storage medium comprising instructions that, when executed, cause one or more processors to:

output, at a touch-sensitive display coupled to a computing device, a base portion of a virtual keyboard;

receive, at the touch-sensitive display, (1) an initial contact at a first region of the touch-sensitive display, the first region being associated with the base portion of the virtual keyboard, and (2) a dragging contact that originates at the first region of the touch-sensitive display and moves into a second region of the touch-sensitive display, the second region being outside the first region and associated with an extended portion of the virtual keyboard activate, at the second region of the touch-sensitive display and in response to (2), the extended portion of the virtual keyboard, wherein the activating includes determining which characters are included in the extended portion of the virtual keyboard;

if the dragging contact is released from the touch-sensitive display at a location within the second region of the touch-sensitive display, activate a selection of a character in the extended portion of the virtual keyboard based at least in part on the location within the second region of the touch-sensitive display; and if the dragging contact moves from the second region of the touch-sensitive display to a location outside of the second region, remove the extended portion of the virtual keyboard from the second region of the touch-sensitive display.

16. The computer-readable storage medium of claim 15, wherein the instructions that cause the one or more processors to activate the extended portion of the virtual keyboard at the second region of the touch-sensitive display comprise instructions that further cause the one or more processors to output, at the second region of the touch-sensitive display, the extended portion of the virtual keyboard.

17. The computer-readable storage medium of claim 15, wherein the instructions further cause the one or more processors to remove the extended portion of the virtual keyboard from the second region of the touch-sensitive display after activating the selection of the character.

18. A tangible computer-implemented system comprising:
at least one processor;
a touch-sensitive display operatively coupled to the at least one processor and configured to output a primary virtual keyboard at a first area of the touch-sensitive display that is associated with the primary virtual keyboard, wherein the primary virtual keyboard includes a set of primary keys, wherein the touch-sensitive display is configured to activate an extended virtual keyboard at a second area of the touch-sensitive display, outside the first area, in response to receiving at the touch-sensitive display (1) an initial contact at the first area, and (2) a dragging contact that originates at the first area and moves into the second area, the at least one processor being configured to determine which characters are included in the extended portion of the virtual keyboard,
wherein if the dragging contact is released from the touch-sensitive display at a location within the second area of the touch-sensitive display, the at least one processor is configured to activate a selection of a character from an extended virtual keyboard based at least in part on the location within the second area; and
wherein if the dragging contact moves from the second area of the touch-sensitive display to a location outside of the second area, the at least one processor is configured to remove the extended portion of the virtual keyboard from the second area.

* * * * *